March 27, 1962        G. F. LAURIN        3,027,551
METER READING ATTACHMENT
Filed Aug. 6, 1958
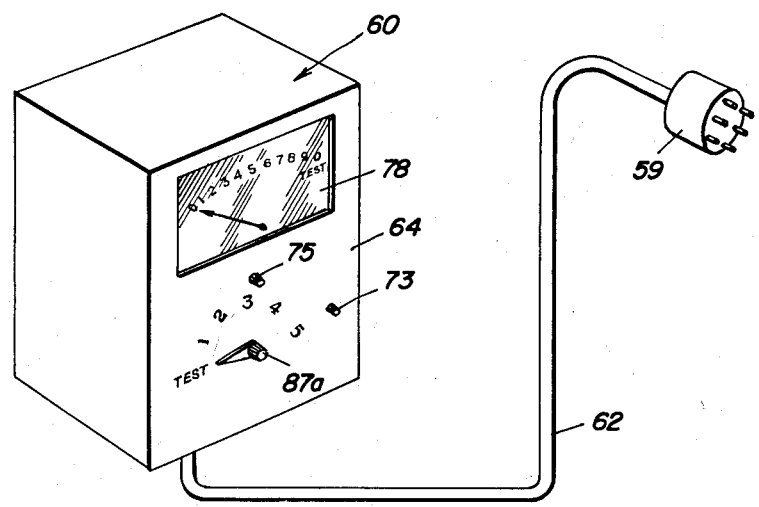
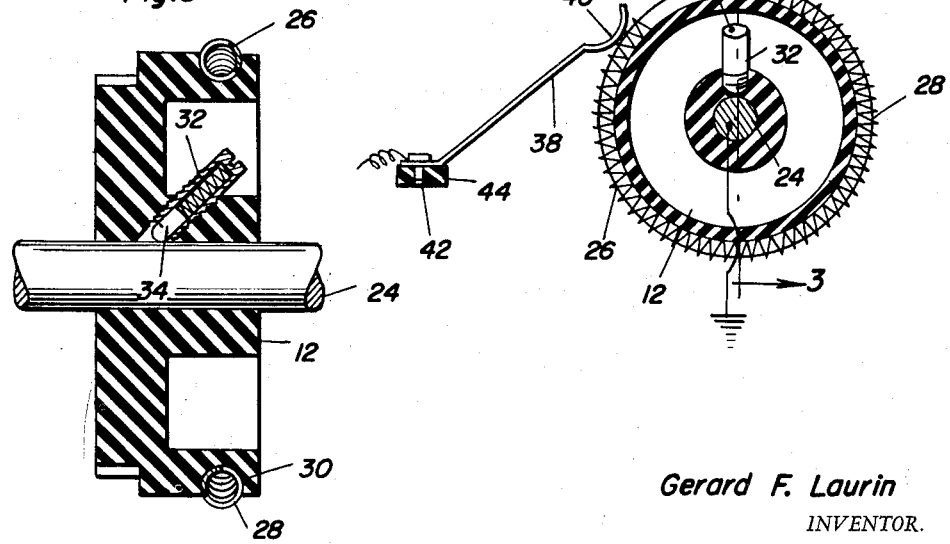
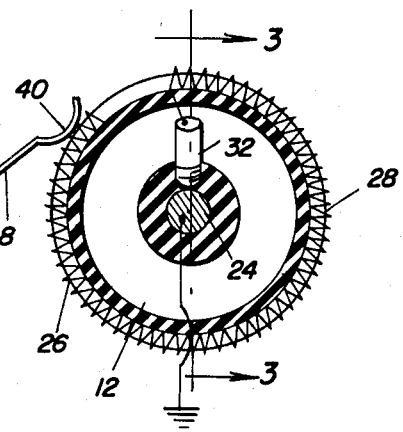
Gerard F. Laurin
INVENTOR.

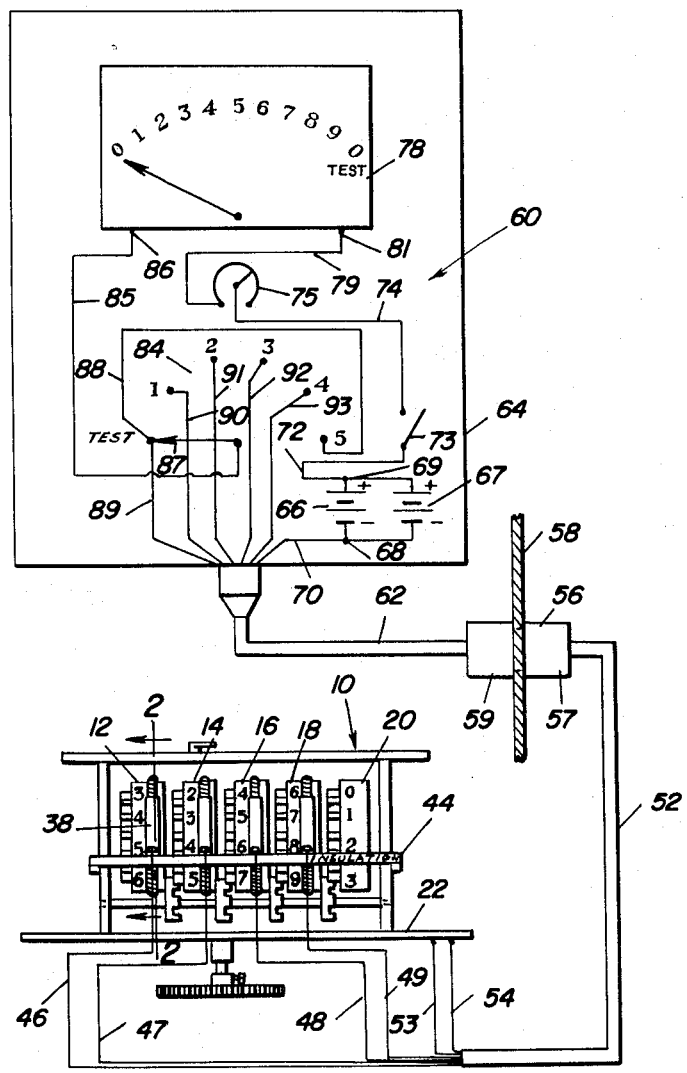

United States Patent Office 3,027,551
Patented Mar. 27, 1962

3,027,551
METER READING ATTACHMENT
Gerard F. Laurin, 89 Western Ave., Augusta, Maine
Filed Aug. 6, 1958, Ser. No. 753,581
2 Claims. (Cl. 340—188)

This invention relates to apparatus for obtaining readings from meters at a location remote from the physical position of the meter.

The invention enables a person to read a meter, for instance a water meter, which is located in a basement or other comparatively inaccessible place, from any distant point, preferably outside of the building.

An object of the invention is to provide apparatus for obtaining meter readings through the measurement of electrical resistance associated with the meter. A water meter is a typical example of a meter which is comparatively difficult to read since the water meter is ordinarily located within a house. Therefore the ensuing description shall be directed toward an example of the invention involving a water meter.

The invention is embodied in the application of a variable resistance for at least one and preferably all or substantially all of the counters of the meter. The resistances are connected in circuit with a portable read-out unit so that when the unit is plugged in with the meter, for example through a conventional connector having one part stationary and the other part movable with the read-out unit, the variable resistors in the meter are switched into circuit with a test instrument such as a re-calibrated microammeter. The calibrations of the microammeter may be in correspondence with the graduations on the conventional water meter.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of a read-out unit to be used in connection with a meter for obtaining a reading therefrom.

FIGURE 2 is an enlarged sectional view taken on the line 2—2 of FIGURE 4 and showing a variable resistor but adapted to become adjusted in accordance with the position of one of the counters of the meter register.

FIGURE 3 is a sectional view taken on the line 3—3 of FIGURE 2.

FIGURE 4 is a diagrammatic view showing the wiring of the read-out unit and the meter register.

In the accompanying drawings there is an apparatus to obtain a meter reading at the location remote from the meter. In FIGURE 4 there is a conventional water meter register 10 altered to the extent of applying a variable resistor on each of the counters 12, 14, 16, 18 and 20. Since the meter is absolutely conventional, aside from the alterations thereto shown in FIGURES 2-4, the full details of the meter are not shown and described. It is understood, however, that the five counters are rotated to keep an accurate check of water consumption. The meter has a frame 22 that supports a spindle assembly 24 grounded electrically to the frame. Typical variable resistor 26 is shown in FIGURES 2 and 3, as applied to counter 12. The counter is made of electrically insulating material and has a coil resistance wire 28 in a circumferential groove 30 of the counter. One end of the resistor is connected with brush holder 32, the latter attached to the hub of the counter and having brush 34 in contact with grounded spindle 24. The brush holder and brush can be made as a spring-loaded ball, spring-loaded plunger or in any other suitable manner so long as firm contact is made between the brush elements and spindle 24. Each of the other resistors associated with each of the other counters may be made identically.

For each resistor there is a brush, for instance, typical brush 38 for resistor 36 (FIGURE 2). The brush 38 is made of a spring metal strip having a curved outer end or shoe 40 in contact with the resistance element 28, and having an inner end attached, for instance by rivet 42, to the insulating support 44 that is connected with a frame 22 of the meter. The brush 38 cooperating with resistance element 28 forms a variable resistor whose value changes in accordance with the position of the counter 12.

Since there are five counters in meter 10 there would be five variable resistors and individual wires 46, 47, 48 and 49 together with one additional wire for the counter 20. Each of the illustrated wires 46, 47, 48 and 49 are connected to individual brushes for the variable resistors of counters 12, 14, 16 and 18. The counter 20, although furnishable with a variable resistor, is not used in the water meter application since this last counter indicates only units while the other counters indicates tens, hundreds, thousands, and ten-thousands of gallons. It is quite unnecessary to make a unit reading although, it is within the purview of the invention to complete the meter by having a variable resistance for each and every counter. For a water meter application, as indicated previously, this is not essential from a practical standpoint.

Cable 52 is operatively connected with meter 10 and has the four wires or conductors 46, 47, 48 and 49 housed therein. There are two additional wires 53 and 54 in cable 52, and these are attached to the frame of the meter. Wires 53 and 54 are test leads as will subsequently appear. Electrical connector 56 has one connector part 57 adapted to be fixed, for instance attached to wall 58 of a building within which meter 10 is located. Connector part 59 is portable and is adapted to be separably secured to connector part 57. The connector 56 is standard and for the illustrated meter, it must have six sockets and six prongs respectively to continue the electrical circuit from meter 10 to read-out unit 60.

The read-out unit is portable and is designed to be carried from one meter outlet, represented by connector part 57, to the next by a man reading the meters in a community. Cable 62 is attached to connector part 59 and to the casing 64 of the read-out unit 60. Casing 64 houses a part of the electrical circuit of the complete apparatus shown in FIGURE 4. There is a source of D.C. potential at low voltage, for example a pair of dry cell batteries 66 and 67 having terminals 68 and 69. Terminal 68 has a conductor 70 connected to it which connects through connector 56 to the test lead 54. Conductor 72 is attached to terminal 69 and to a control switch 73. Conductor 74 extends from switch 73 to a potentiometer, variable resistor or rheostat 75, and the latter is operatively connected with an instrument 78 from which resistance measurements may be made. Conductor 79 extending from device 75 is attached to a terminal 81 of instrument 78. Instrument 78 can be selected from a variety of instruments, for instance a microammeter which is re-calibrated so that the graduations thereon correspond to the graduations on each of the counters of meter 10.

The electrical circuit continues to selector switch 84 having six fixed contacts, one of which is designated as "test" and the other five of which are numerically designated from 1 to 5 to respond to the five counters 12, 14, 16, 18 and 20, respectively. A conductor 85 extends from the terminal 86 of instrument 78 and is connected with the movable contact 87 of switch 84. Conductor 88 is attached to the test contact of switch 84 and constitutes a jumper since it is also attached to fixed contact 5 of switch 84. Wire or conductor 89 extends from the test contact of switch 84 to connector part 59 through cable 62. The connector 56 associates conductors 89 and 53, each cooperating to form a test lead.

Conductors 90, 91, 92 and 93 are secured respectively to the fixed contacts Nos. 1, 2, 3 and 4 of switch 84 and to the variable resistors of counters 12, 14, 16 and 18 through cables 62, and 52, together with connector 56. This completes the entire electrical circuit of the apparatus. It operates as follows:

When the man who wishes to read the meter approaches the property, for instance, the dwelling where there is a water meter to be read, he makes connection with the meter by plugging in his read-out unit 60 with connector 56. By placing selector switch 84 on the test position (FIGURE 4) current is sent from the batteries through closed switch 73 and device 75, through instrument 78 and then through the test position of selector switch 84. Current flows through test leads 89, 53, 54 and 70 and back to the other side of the source of electrical potential. A reading can then be taken on instrument 78 to serve a twofold purpose. The device 75 can then be adjusted until the needle of the instrument centers on the "test" position on the face of the instrument 78. The wear on the batteries is compensated and the resistance, depending on the length of wire in cable 52 and in cable 62 are compensated. Once the zero test is set, the person need only turn the selector knob 87a which moves the movable contact 87 to a position where it touches contact No. 1 of switch 84. This will cause the instrument 78 to have its pointer moved to a position which corresponds with the position of counter 12 and will show the reading of counter 12. This is accomplished by the fact that the brush 38 rests on the resistance element 28, and since the resistance element rotates as the counter 12 rotates, the electrical resistance in the variable resistor decreases as the disk travels from the numerals 1 to 9 and this resistance is in turn, measured and indicated on the portable read-out unit instrument 78 face. The electrical circuit is from the source, through switch 73, device 75, instrument 78, conductor 85, switch contacts 87 and 1, and then through the wires 90 and 46 and to ground in meter 10, made possible by brush holder 32 and the grounded spindle 24. Thereafter a reading may be taken by moving selector switch 84 to the next position, and this indicates the position of counter 14 by measuring the instantaneous value of the variable resistance connected with counter 14. The procedure continues until the number 5 is achieved, at which movable contact 87 is touching contact No. 5 of switch 84. Since jumper 88 connects contact No. 5 to the test position, the reading on the meter will be essentially "test" and simultaneously "0" in the application of the invention to a water meter.

It is understood that the principles of the invention are applicable in connection with meters other than water meters, in which case each of the counters may be operatively connected within the circuit for obtaining individual readings.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. Means for adapting a conventional meter of the type including a grounded spindle carrying rotatable counters for enabling said meter to be read at a point remote from the meter comprising a toroidal resistance coil carried on the circumferential surface of each of said counters, each of said resistance coils terminally connected to said spindle, a fixed brush resiliently engaged with each of said toroidal coils and in electrical contact therewith, a conductor electrically connected to each of said fixed brushes, said conductors extending to a female receptacle fixedly mounted on a wall, a portable read out unit, said unit including a source of electrical energy, a variable resistor serially connected to said source, an ammeter serially connected to said variable resistor, a multiposition switch connected to said ammeter having a plurality of wires electrically extending therefrom, each of said wires connected to a male plug, said plug receivable in said receptacle for connecting each of said wires to one of said conductors whereby an ammeter reading taken in each position of said multiposition switch will indicate the rotational position of an associated counter.

2. Means for adapting a conventional meter of the type including a ground spindle carrying rotatable counters for enabling said meter to be read at a point remote from the meter comprising a toroidal resistance coil carried on the circumferential surface of each of said counters, each of said resistance coils terminally connected to said spindle, a fixed brush resiliently engaged with each of said toroidal coils and in electrical contact therewith, a conductor electrically connected to each of said fixed brushes, said conductors extending to a female receptacle fixedly mounted on a wall, a portable read out unit, said unit including a source of electrical energy, a variable resistor serially connected to said source, an ammeter serially connected to said variable resistor, a multiposition switch connected to said ammeter having a plurality of wires electrically extending therefrom, each of said wires connected to a male plug, said plug receivable in said receptacle for connecting each of said wires to one of said conductors whereby an ammeter reading taken in each position of said multiposition switch will indicate the rotational position of an associated counter, one of said conductors being connected directly to ground whereby said conductor may be utilized as a test lead for adjusting said variable resistor for properly setting said ammeter.

References Cited in the file of this patent

UNITED STATES PATENTS

| | | |
|---|---|---|
| 1,244,634 | Neff | Oct. 30, 1917 |
| 1,768,552 | Freeman | July 1, 1930 |
| 1,800,019 | Hewett | Apr. 7, 1931 |
| 1,837,113 | Cheney | Dec. 15, 1931 |
| 2,007,669 | Yates | July 9, 1935 |
| 2,098,227 | Chauveau | Nov. 9, 1937 |
| 2,285,819 | Leathers | June 9, 1942 |
| 2,333,321 | Leathers | Nov. 2, 1943 |
| 2,774,063 | Grinstead | Dec. 11, 1956 |